UNITED STATES PATENT OFFICE.

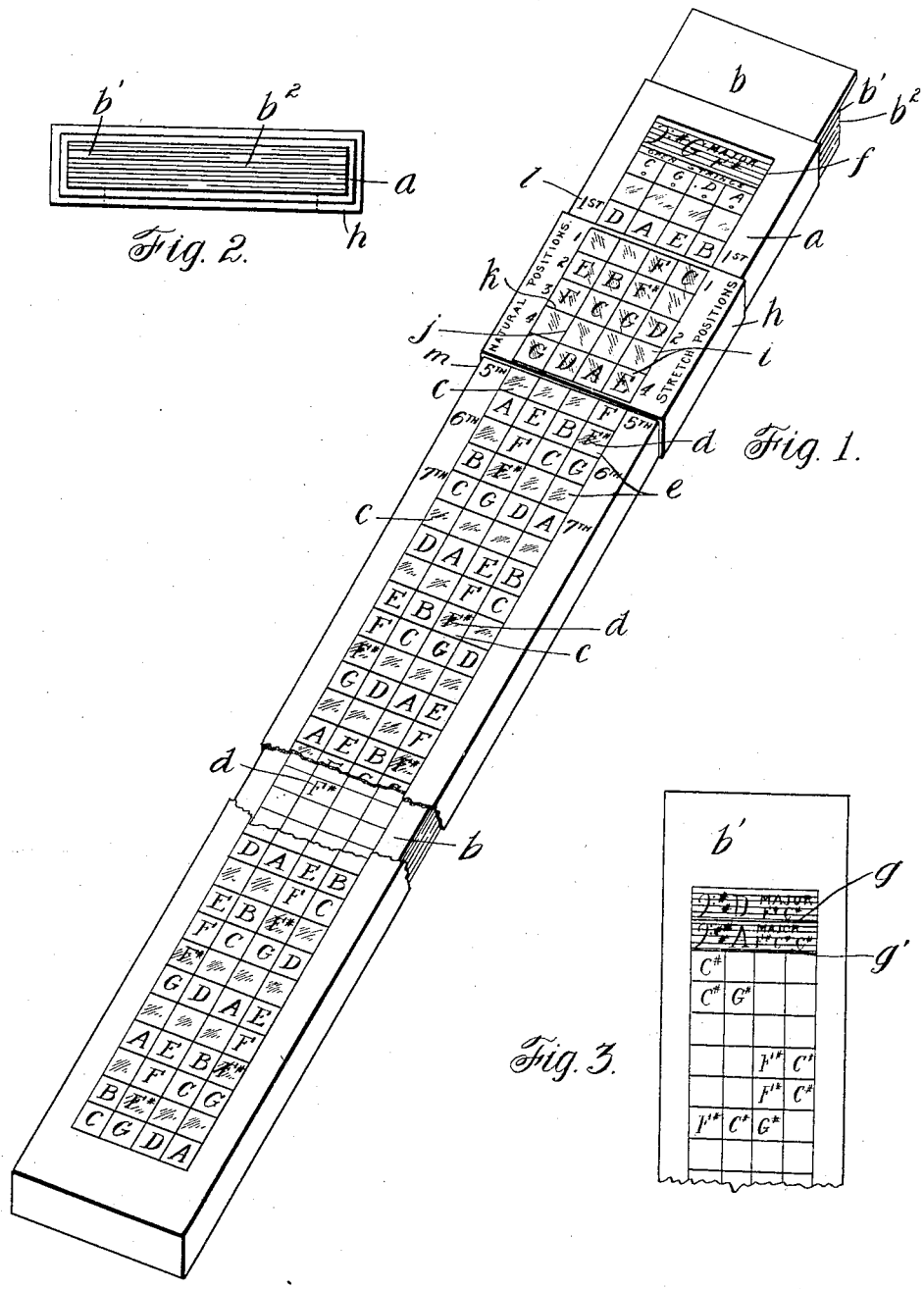

CHARLES DUNCAN RAFF, OF PORTLAND, OREGON.

FINGER-POSITIONING CHART FOR STRINGED INSTRUMENTS.

1,300,193.  Specification of Letters Patent.  Patented Apr. 8, 1919.

Application filed June 3, 1916. Serial No. 101,631.

*To all whom it may concern:*

Be it known that I, CHARLES D. RAFF, a citizen of the United States, and a resident of the city of Portland, county of Multnomah, State of Oregon, have invented a certain new and useful Improvement in Finger-Positioning Charts for Stringed Instruments, of which the following is a specification.

The object of my invention is to provide an adjustable chart for beginner-students designed to teach: (1) the location of all the notes, of the diatonic scale, playable on the string instrument, and incidentally all the notes playable on any string; (2) the fingers by which these notes are to be produced; (3) the required shifting of the hand in order to play certain of these notes; (4) how the other scales are produced by modifying certain notes in the diatonic scale; (5) how certain notes in any scale may be modified by accidentals. That such study of the instrument is desirable is evident to all teachers, for it makes the pupil acquainted with the instrument. A further special function of my chart is to teach the pupil, when playing in any one position, whether the fingers are to be placed in their natural position, that is, close together or whether they must be stretched or spaced apart in order to secure correct intonation.

The details of construction of my device are fully illustrated in the accompanying drawings, in which:

Figure 1 shows a perspective view of my chart as used in practice, parts of the outer case or body being broken away to show the inserted slides;

Fig. 2 is a top-end view; and

Fig. 3 is a detail of one of the slides.

The case, $a$, is made to accommodate the desired number of slides $b$, $b'$, $b^2$. The upper face of the case, $a$, bears alined characters spaced to correspond with the notes of a diatonic scale playable on each string of the instrument, such characters being consecutively arranged in parallel rows extending longitudinally of said case. The illustration is based on the strings of a violoncello, and shows the notes, marked in capital letters playable on each string in the scale of C major, the uppermost notes representing those produced by playing the open strings.

The spaces $c$ intervening between the characters spaced apart are open, that is, either cut out, or the face of the case is made transparent in those parts.

Each of the slides bears the name and signature of the scale or scales to which it relates, and the face of each slide is marked with supplemental characters as $d$ so located as to appear through said cut-out or transparent spaces $c$ when the slide has been properly adjusted. To effect such adjustment the upper face of the case $a$ is provided with a space $f$, and the name of the scale produced by the slide is so located that when such name appears in the space $f$, as shown in Fig. 1, the supplemental characters borne by the slide will be located adjacent the notes which are to be raised or lowered, in order to produce another scale. The slides may, for convenience, be marked with horizontal bars, as $g$, see Fig. 3, to facilitate their proper positioning.

On the case, $a$, slides a sleeve $h$ which may be made of transparent material, or have the portions $i$ cut out to permit the characters on the underlying face of the case to be seen through the sleeve $h$. The latter bears on its face the longitudinal and transverse bars $j$, $k$, and the spaces, as $i$, between the longitudinal bars $j$ are thus alined with the characters designating the notes playable on the respective strings, when the hand is in any one position. The sleeve $h$ is just long enough to expose the notes playable with the hand in any position. The purpose of this sleeve is to impress upon the student the required position of the fingers, that is to say, whether they must be placed in their natural or closed position, or when to be stretched or spread apart, in order to produce the tones desired to be played.

This sleeve also shows to the student, in a comprehensive manner, the notes that may be played in any one position of the hand. For this purpose the edges of the sleeve are provided with the vertically alined columns of numerals 1, 2, 3, 4, set close together, and the columns 1—2—4 spaced apart, thereby indicating what notes will be produced on the violoncello, by the consecutive fingers placed close together, and what notes will be produced by the placing of the first, second, and fourth fingers placed spaced apart. The numerals also inform the student of the finger to be used in playing a particular note.

The sides of the case, $a$, are marked with the characters 1st, 2nd, 3rd, 4th, 5th, 6th and 7th, as indicated by *m*, which locate the different positions of the hand and with respect to which the sleeve *h* is to be adjusted so as to show what notes may be played by the fingers in any position; thus, as shown in Fig. 2, the sleeve *h* is so placed as to show what notes may be played in the second position.

I claim:

1. An adjustable finger positioning chart for string instruments consisting of an elongate case bearing alined characters spaced to correspond with the notes of a diatonic scale playable on each string, and a slide in such case bearing supplemental characters exposed by the spaces between the characters on the case, thereby modifying the scale shown on the latter.

2. An adjustable finger positioning chart for string instruments consisting of an elongate case bearing alined characters spaced to correspond with the notes of a diatonic scale playable on each string, a slide in said case bearing supplemental characters exposed by the spaces between the characters on the case, thereby modifying the scale shown on the latter, and a sleeve slidable over said case provided with vertically and horizontally alined spaces through which the underlying characters are visible, said sleeve being just long enough to expose the notes playable with the hand in any position.

CHARLES DUNCAN RAFF.